United States Patent [19]
Joliey

[11] Patent Number: 5,404,149
[45] Date of Patent: Apr. 4, 1995

[54] ELECTRONIC DATA DISPLAY DEVICE

[75] Inventor: Bernard Joliey, Croix, France

[73] Assignee: RASEC Communication (Societe Anonyme), Romorantin, France

[21] Appl. No.: 174,192

[22] Filed: Dec. 27, 1993

Related U.S. Application Data

[63] Continuation of Ser. No. 784,305, Oct. 31, 1991, abandoned.

[30] Foreign Application Priority Data

Nov. 7, 1990 [FR] France .................. 90 13776

[51] Int. Cl.⁶ .................................. G09G 3/02
[52] U.S. Cl. .............................. 345/1; 345/212
[58] Field of Search ............ 345/1, 212, 211; 340/825.06, 825.36, 825.35; 235/383

[56] References Cited

U.S. PATENT DOCUMENTS

| | | | |
|---|---|---|---|
| 3,693,155 | 9/1972 | Crafton et al. | 340/147 |
| 4,002,886 | 1/1977 | Sundelin | 340/825.35 |
| 4,418,333 | 11/1983 | Schwarzbach et al. | 340/310 A |
| 4,430,639 | 2/1984 | Bennett | 340/717 |
| 4,438,432 | 3/1984 | Hurcum | 340/825.35 |
| 4,465,559 | 10/1984 | Dye | 340/717 |
| 4,500,880 | 2/1985 | Gomersall et al. | 340/825.35 |
| 4,535,401 | 8/1985 | Penn | 340/310 R |
| 4,800,363 | 1/1989 | Braun et al. | 340/310 R |
| 4,800,376 | 1/1989 | Suga et al. | 340/717 |
| 4,806,905 | 2/1989 | McGowan, III et al. | 340/310 R |
| 5,095,305 | 3/1992 | Ide et al. | 340/813 |
| 5,105,183 | 4/1992 | Beckman | 340/717 |

Primary Examiner—Ulysses Weldon
Assistant Examiner—Regina Liang
Attorney, Agent, or Firm—Darby & Darby

[57] ABSTRACT

The primary interface (2) is connected to all secondary interfaces (3) by a single two-wire line (2) carrying an alternating supply current under low voltage, and control and test data in the form of pulses; each secondary interface (3) is connected to all its labels (4) by a single two-wire line (34) carrying an alternating supply current under very low voltage, and control and test data in the form of pulses; all data are transmitted using the carrier current principle.

6 Claims, 1 Drawing Sheet

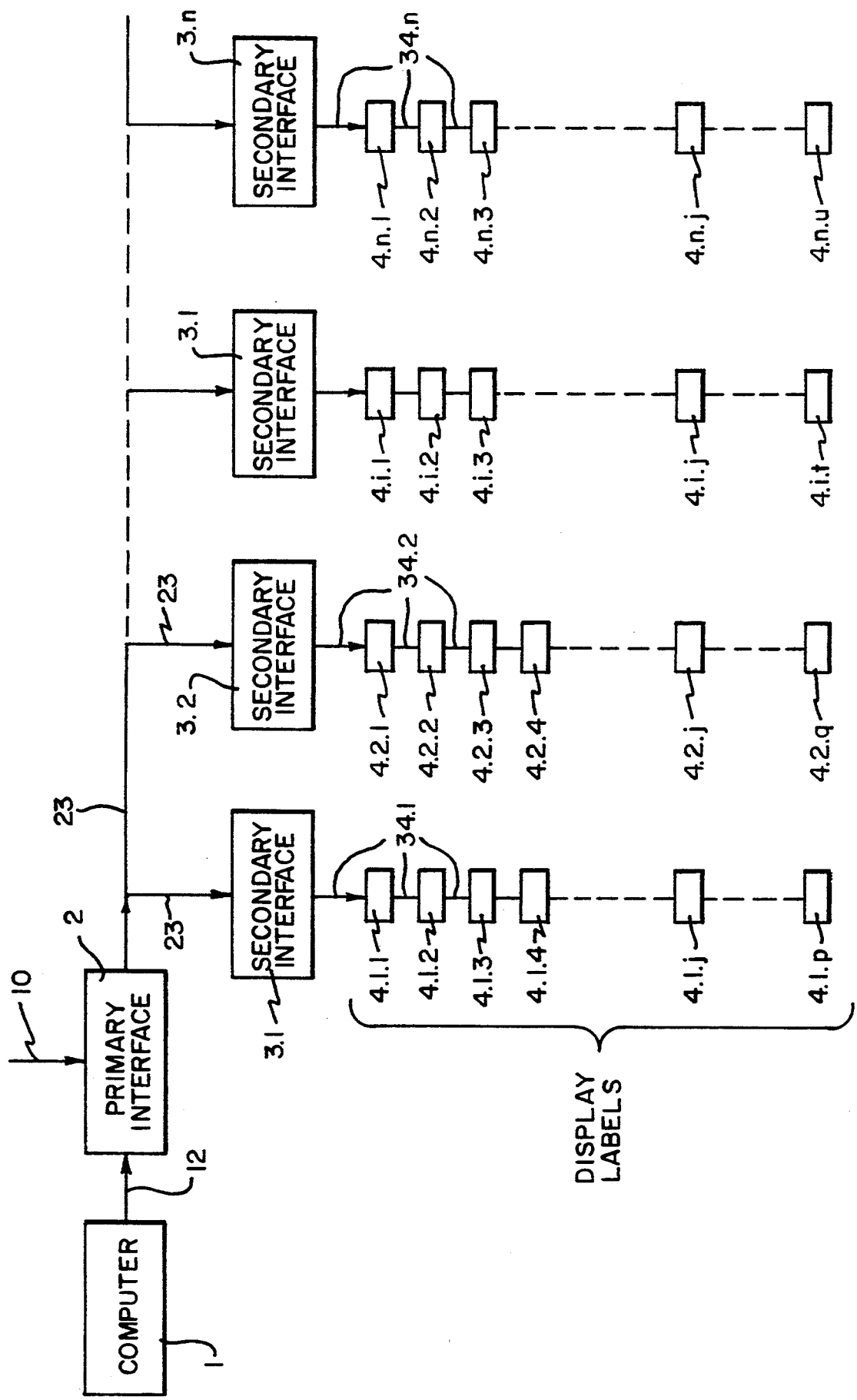

ELECTRONIC DATA DISPLAY DEVICE

This is a continuation of application Ser. No. 07/784,305, filed Oct. 31, 1991, now abandoned.

BACKGROUND OF THE INVENTION

The present invention relates to an electronic data display device.

These devices are at present the subject of intensive research, as they must permit the display of diverse data concerning products, for example those offered for sale in a store of large area, in a simple manner, from a central control station.

At the present time, most stores display the data concerning the nature, weight, price, etc. of the products on supports or labels of paper or plastic placed on the shelves near each product.

When one of the data must be changed, it is necessary that a person go to the areas to make the necessary corrections.

The purpose of the electronic data display devices being studied is to replace the paper labels by display modules, the driving of which is ensured from a control station comprising a computer.

Owing to such devices, as all modules receive the data from the central computer, it is easy to change the displayed data by an appropriate and single control of the computer.

One can then considerably reduce both the time necessary for displaying new data and the risks of errors always possible when data must be transmitted between several persons in the course of their processing.

BRIEF DESCRIPTION OF THE INVENTION

Some devices presently proposed require as many transmission cables between the computer and display modules and as many power supply cables as there are display modules, which makes their installation complex to carry out and hence subject to defects of operation.

Other devices are simpler to install as they require only three conductors, for ground, for electric power supply, and for the transmission of the data, to which all display modules are connected in parallel. However, these devices require the installation of a secondary interface linked with each display module to ensure the conversion of the data and the return of the data permitting to verify the proper fulfillment of the command given from the central computer.

The invention aims to propose a device which is quick, easy and reliable as to installation and use, even if the number of display labels is very large.

To that effect, the subject of the invention is an electronic data display device, of the type comprising a computer, a primary interface, secondary interfaces each controlling at least one electronic display label, characterized in that:

the primary interface is connected to all secondary interfaces by a single two-wire line carrying an alternating supply current of low voltage, and control and test data in the form of pulses, each secondary interface is connected to all its labels by a single two-wire line carrying an alternating supply current of very low voltage, and control and test data in the form of pulses, all data are transmitted using the carrier current principle.

This device is further advantageous in that:

the low voltage used in the line connecting the primary interface to the secondary interfaces is 220 volts.

the very low voltage used in the lines connecting each secondary interface to its labels is 12 volts.

BRIEF DESCRIPTION OF THE DRAWINGS

The device in the single FIGURE according to the invention will be better understood by the description that follows with reference to the single drawing attached hereto.

DETAILED DESCRIPTION OF THE INVENTION

In this drawing, the electronic display device according to the invention has been represented schematically. Reference numeral 1 indicates the central computer from which all display modules 4 are controlled.

The computer 1 is powered in a manner known in itself.

The computer could, of course, be of any suitable type and capacity, for example a micro-computer.

This computer 1 transmits the data via a line 12 to a primary interface 2, supplied with alternating current at the line voltage 220 V by a line 10.

The primary interface 2, in turn, transmits this data via a single primary line 23 to secondary interfaces 3.1, 3.2, . . . 3.n, all connected in parallel to line 23.

Each of these secondary interfaces 3 is connected by a secondary line 34 to a plurality of modules 4.

In the drawing, the general reference 3 has been given to the secondary interfaces, followed by an index 1, 2, . . . n, . . . , n defining their position along line 23. In like manner, there has been given to the modules or electronic display labels the general reference 4, followed by the index of the secondary interface on which it depends and of the index defining their position on the line 34 coming from the secondary interface.

In the same manner, each secondary line 34 coming from a secondary interface 3 bears the position index of said interface.

As could thus be seen in the drawing, each secondary interface 3 drives several modules or labels 4. Of course, the number of modules 4 connected to each secondary interface 3 may vary from one to the other and this is why different indices p, q, t, u have been chosen for the last modules 4 of each line 34.

In a practical manner, in a store of large area surface a secondary interface 3 can be disposed at the head of each gondola of presentation of the products offered for sale, and connect thereto all labels necessary for marking products present on this gondola.

According to the invention, the lines 34 and the line 23 are all common two-conductor lines carrying alternating current.

Lines 23 and 34 carry at the same time the data from computer 1 toward the labels 4 for their control and in reverse direction for the testing of the display operations.

Line 23 is fed with alternating current of low voltage, for example, in a simple manner as it is the usual line voltage, of 220 V.

As to the lines 34, they are supplied with alternating current of very low voltage, for example 12 V, and this permits not having any flow of current that could be dangerous at display units accessible to the public.

The data are transmitted in binary code by computer 1 over line 12 up to the primary interface 2 from which these data are sent over line 23 in the form of pulses transmitted according to the carrier current principle.

Each secondary interface 3 demodulates the data which it receives from line 23 in order to interpret them and to keep them in memory if they are intended for it. In each secondary interface 3, the data which concern it are transmitted in the form of pulses and over 12 V line 34 again using the carrier current principle.

These data in binary code carried by line 34 by an alternating carrier current of 12 V are then demodulated in the respective labels 4 of the line, in order to execute the commands thus received and consequently to modify their display When the display is carried out, a test information is sent in reverse direction into the device and is in turn modulated or demodulated in order to be transmitted over 12 V line 34, and over 220 V line 23, up to the computer 1.

The transmissions and receptions occur at a higher than usual frequency: 262 kHz for example.

The device according to the invention permits, with common 2-wire lines and with a reduced number of secondary interfaces, to equip a store quickly and at low cost, even if it is very large and presents very numerous products.

I claim:

1. An electronic data display system comprising:
   a computer producing digital data uniquely addressed to each of a plurality of secondary interfaces and supplying said digital data in binary code form to a primary interface over a first coupling line,
   a line connected to said primary interface and supplying an alternating current supply of a first voltage of an amplitude not greater than 500 V,
   said plurality of secondary interfaces each having memory means and pulse demodulating means,
   a single two-wire line connecting the output of said primary interface to said plurality of secondary interfaces to supply each secondary interface with said alternating current supply of first voltage amplitude, said primary interface transforming the digital data into first current pulses generated according to the carrier current principle at a predetermined carrier frequency and transmitting said first current pulses over said two-wire line to said plurality of secondary interfaces,
   the demodulating means of each secondary interface demodulating the first current pulses received over said two wire line into data and the memory means of the secondary interface storing the data addressed to the memory means,
   the output of each secondary interface being connected to at least one associated electronic display module to feed said at least one display module with an alternating current supply of a second voltage of an amplitude not greater than 48 V, and
   each said secondary interface having means for transmitting to its said at least one associated electronic display module the digital data derived from said first current pulses and stored in its memory as second current pulses according to the carrier current principle at said predetermined carrier frequency and each display module having means for demodulating the second current pulses and displaying the data they represent.

2. System according to claim 1 for operation from a commercial power source which produces a line voltage wherein said first voltage supplied to said primary interface and supplied over the two-wire line from the primary interface to the secondary interfaces is the line voltage.

3. System according to claim 1, wherein said second voltage used in the lines connecting each secondary interface to its associated at least one display module is 12 volts.

4. System according to claim 1, wherein the frequency used for implementing the carrier current principle in said single two wire line is in the order of 262 kHz.

5. System according to claim 1, wherein the frequency implementing the carrier current principle on each of said single two wire line and in the line between a said secondary interface and its at least one associated display module are the same.

6. System according to claim 5, wherein the frequency used for implementing the carrier principle in the line between a said secondary interface and in at least one associated display module is in the order of 262 kHz.

* * * * *